United States Patent [19]

Thomazet et al.

[11] Patent Number: 4,804,516
[45] Date of Patent: Feb. 14, 1989

[54] FUEL ASSEMBLY HAVING ANTI-CORROSION GRIDS

[75] Inventors: Joël Thomazet, Pusignan; André Kolmayer, Lyon, both of France

[73] Assignees: Framatome, Velizy, France; Compagnie Generale Des Matieres Nucleaires, Villacoublay, France

[21] Appl. No.: 52,627

[22] Filed: May 20, 1987

[30] Foreign Application Priority Data

May 20, 1986 [FR] France ............................. 86 07133

[51] Int. Cl.$^4$ ............................................. G21C 3/34
[52] U.S. Cl. ..................................... 376/439; 376/443
[58] Field of Search ................................ 376/439, 443

[56] References Cited

U.S. PATENT DOCUMENTS

| | | | |
|---|---|---|---|
| 3,368,946 | 2/1968 | Jenssen | 376/439 |
| 3,764,471 | 10/1973 | Ripley | 376/439 |
| 3,862,000 | 1/1975 | Pugh | 376/439 |
| 4,576,786 | 3/1986 | DeMario | 376/439 |
| 4,692,302 | 9/1987 | DeMario | 376/439 |

*Primary Examiner*—Donald P. Walsh
*Attorney, Agent, or Firm*—Pollock, Vande Sande & Priddy

[57] ABSTRACT

Fuel assembly for the core of a nuclear reactor comprising spacing grids situated in the upper part of the assembly arranged at smaller intervals from one another than the grids situated in the lower part of the assembly. The upper grids ensure a more intense mixing of the coolant downstream than the lower grids, so as to reduce corrosion at the upper part and the temperature difference between the top of the sheath and the coolant.

4 Claims, 5 Drawing Sheets

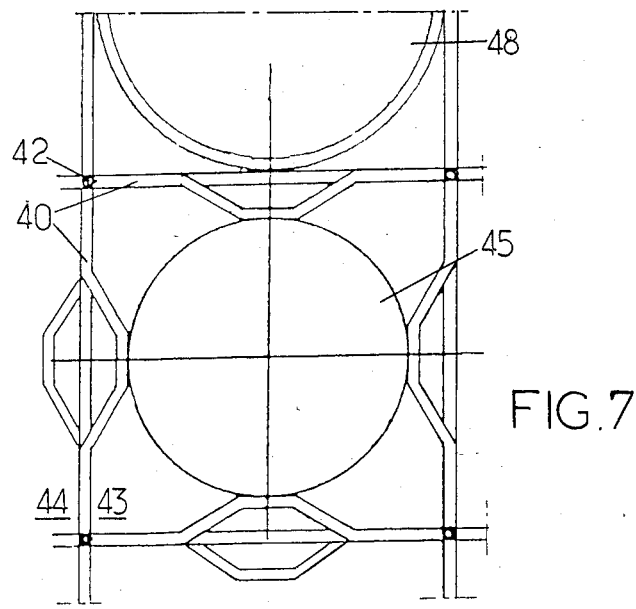
FIG.7
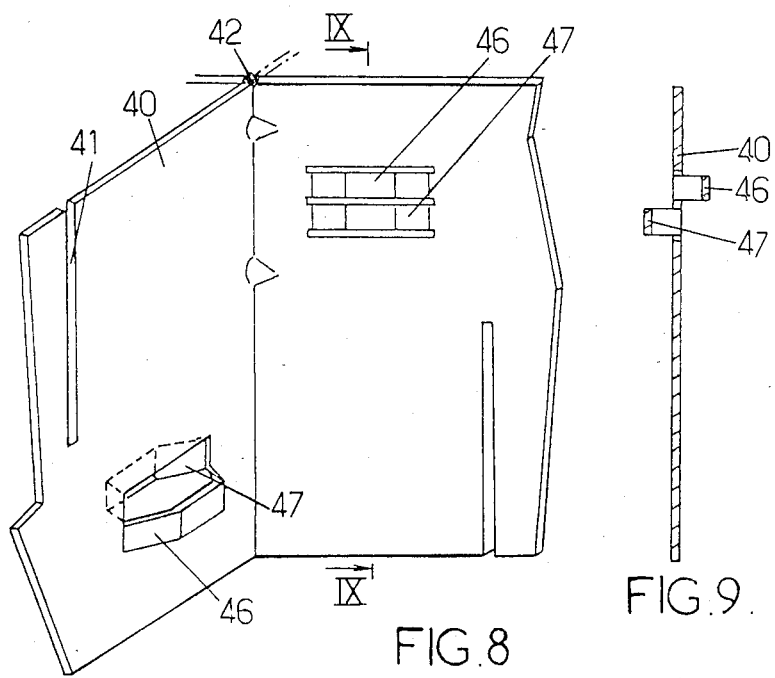
FIG.8
FIG.9

FUEL ASSEMBLY HAVING ANTI-CORROSION GRIDS

BACKGROUND OF THE INVENTION

The invention relates to fuel assemblies for a nuclear reactor in which a coolant is circulated upwardly through the nuclear core including the assemblies and disposed in the reactor vessel. Each assembly is of the type comprising a bundle of fuel elements each formed by a metal tubular sheath containing a stack of nuclear fuel pellets and closed by gas tight caps. The elements are held in a rigid structure including end pieces connected together by tie rods and spacer grids spaced a part along the tie rods. The elements are distributed at the nodal points of a square network by means of the spacer grids arranged at predetermined intervals.

The invention is particularly suitable, although not exclusively, for assemblies of pressurized water nuclear reactors, called PWRs, having fuel elements with metal sheath made with a zirconium base alloy.

A certain number of separate functions are performed by grids of fuel assemblies of the type which have just been described. On the one hand the grids support laterally and brace the fuel elements containing the fissile material. The grids also ensure structural protection of the assemblies against transverse shocks during handling, during incidents of earthquake origin or operational accidents. On the other hand these grids allow the mixing of the coolant streams circulating upwardly through the core. Such mixing of the coolant is important to allow optimal and continuous regular extraction of the heat released by the fuel elements containing the fissile material, and to avoid local temperature increases within the coolant which could result in a local boiling of the coolant. With an adequate mixing it is thus possible to obtain a general enthalpy increase for the coolant, which is more homogeneously transversely distributed in the core than without mixing, in order to allow a maximum output thermal power dissipation from the core while avoiding local boiling.

Various types of assemblies are already known comprising spacer grids spaced at predetermined intervals and providing the above-mentioned functions. Nuclear assemblies in the prior art in PWR reactors typically comprise grids arranged at regular intervals from top to bottom of the assembly. French document No. 84 18 645 describes assemblies of this type comprising a skeleton or rigid structure having two end pieces connected together by elongated elements such as guide tubes and a plurality of grids spaced apart along the guide tubes and forming support cells for the elements of a bundle of fuel elements, said elements being distributed at the nodal points of a regular network. The grids are of different types and consist in median grids, designed so as to resist lateral shocks and provided with fins to create turbulence in the flow of the coolant along and inside the assembly, lower grids and upper grids ensuring the bracing of the elements and creating a lesser pressure drop for the coolant than the median grids.

This solution solves numerous problems. However, in the particular case of zirconium-based alloy sheath of the fuel elements, applicants have noticed that corrosion appear to a greater extent at the top part of the elements than at their bottom part.

It is known that the local corrosion phenomena depend from the temperature of the coolant and the local thermal power, locally dissipated by each fuel element, and that the temperature of the coolant existing at the top of the core is inevitably greater than at the bottom part of the core. These two factors: the temperature of the coolant and the thermal power locally released by the core, could explain to the technician skilled in the art the differential corrosion between the top and the bottom parts of the fuel elements, but by the same token will convince him that this phenomenon is unavoidable.

SUMMARY OF THE INVENTION

It is an object of the invention to provide an improved fuel assembly for a nuclear reactor core. It is a more particular object to provide an assembly which reduces corrosion at the top part of the elements.

For that purpose, it has firstly been necessary to provide a new analysis of the phenomena while noticing that it should exist other causes of acceleration of corrosion at the top part of the sheath than the causes known by the prior art. This analysis has led to the hypothesis that the oxide layer, formed on the sheath or cladding of the elements and due to corrosion, renders worth the heat exchange between the fuel element and the pressurized water surrounding the elements and so aggravated the corrosion. And, due to the fact that the thickness increase of the oxide layer is more rapid at the top part of the fuel elements where the temperature is higher than at the bottom part, the phenomenon of corrosion is further greatly amplified.

This analysis has been verified by measuring the oxide layer thickness which is formed at the surface of the sheath of an irradiated fuel element at a plurality of points along the sheath. The measurements were performed by means of an eddy current probe. They have shown that the oxide thickness increases considerably from the bottom to the top. For example, this thickness, for one of the fuel sheaths analyzed and which was irradiated at more than 40,000 MWj/tU, was found to be around 18 $\mu$m at the bottom end portion of the sheath and reaches 50 $\mu$m at the top end portion of the sheath. Applicants have also noticed that the oxide thickness is increasing as the increase of the interface temperature between the metal and the oxide which occurs while the fuel element remains in the reactor. The increased thickness of oxide at the top end portion therefore induces an increased temperature at the interface between the metal and the oxide and hence accelerates the formation of oxide.

In order to reduce this phenomenon of increased corrosion at the top part of the sheath, Applicants have sought to increase the heat exchanges which occur between each fuel element and the coolant, i.e. the pressurized water in a PWR at the top part of the element. For this purpose it is an object of the invention to provide particularly a fuel assembly of the above-defined type, wherein the upper grids situated in the upper part of the assembly are disposed at smaller intervals than the lower grids situated at the lower part of the assembly, said upper grids providing an improved flow mixing of the coolant streams (pressurized water) circulating through said upper grids with a more intense mixing of said coolant than the mixing that provide the upper grids of the prior art.

It is thus possible to obtain:

a delay in the appearance of corrosion on the surface of the sheath of the fuel elements at the top part of the assemblies, this being due to:

better mixing of the coolant at the top part of the assembly, while preserving an acceptable pressure drop or head-loss, compatible with an operation of the reactor in good conditions.

a delay in the formation of oxide at the top part of the sheath, without however penalizing the bottom part of the assembly.

The invention also provides an assembly having upper grids provided with fins and lower grids devoid of them. Preferably, the last grid located close to the upper end of the assembly is also devoid of fins.

It is another object of the invention to provide upper grids having a rather light constitution, such as, for example, grids of the type described in French document FR No. 86 02 501. Such grids include a peripheral belt and at least two series of parallel plates, the plates of one series being disposed at an angle to the plates of the other series so that the two series define cells for the passage of the fuel elements; the parallel plates are distributed in at least two beds spaced along the longitudinal direction of the assembly, said plates being provided with half-fins or with fins having respective different orientations respectively in each of the two beds.

The invention will be better understood from the description which follows of a particular embodiment, given by way of non-limiting example.

SHORT DESCRIPTION OF THE DRAWINGS

The description refers to the accompanying drawings, in which:

FIG. 7 is a diagrammatic and isometric view on a large scale showing the intersection of the plates of a grid with a single bed to define a cell for an assembly according to the invention.

FIG. 8 is a schmematic and isometric diagram showing the protruding parts formed on two of the walls of a lower grid of an assembly according to the invention.

FIG. 9 is a sectional view along the line IX—IX of FIG. 8.

DETAILED DESCRIPTION OF PREFERRED EMBODIMENTS

Figure 1:
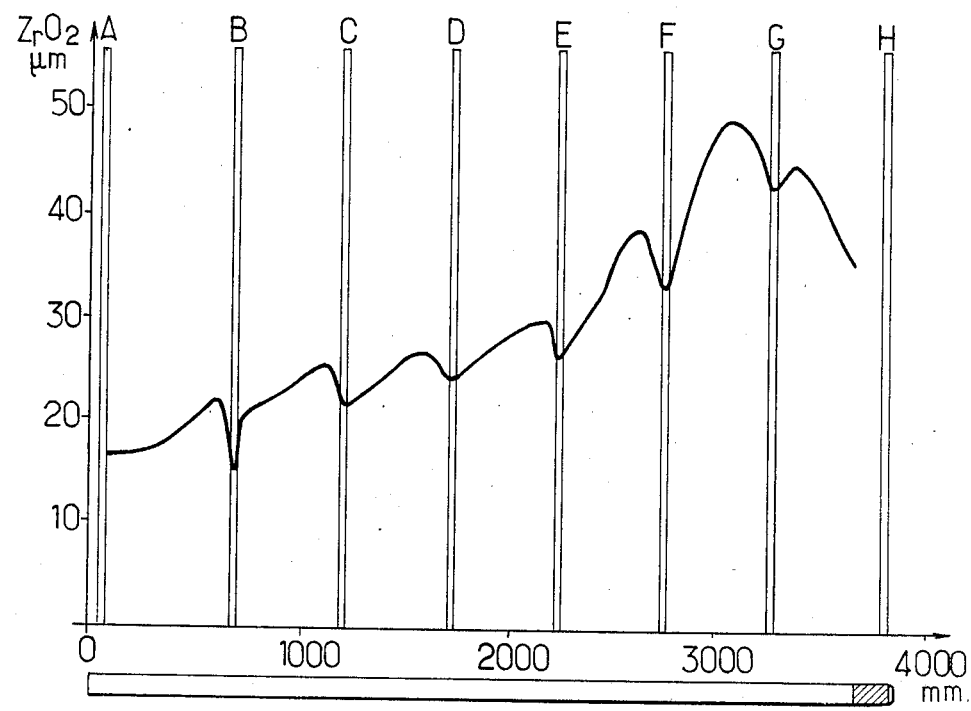
FIG. 1 shows a schematic diagram of the thickness evolution of the oxide layer on the zircalloy sheath of an irradiated fuel element all along said sheath as observed in an assembly of the prior art having regularly spaced grids of known types.

The curve of FIG. 1 shows the evolution of the thickness of the zirconia (oxide) layer of the surface of a fuel element sheath which change according to the measurement location along the longitudinal direction of an assembly of known type, with grids located and regularly spaced along the braces according to the prior art.

The distance between the end of the lower part of the fuel element and the part of the element where the measurement is undertaken appears on the Ox axis, and the measured thickness of oxide layer on the Oy axis. The location of the grids spaced longitudinally along the fuel element is shown on FIG. 1 by vertical bars identified from A to H, the grid A being the grid situated closest to the bottom end part of the assembly and hence to the bottom cap of the element examined.

The curve of FIG. 1, obtained from measurements carried out by Applicants, shows that:

the oxide layer is substantially thicker between the grids E and H than between the grids situated at the bottom part of the assembly.

The thickness of the oxide layer is smaller, compared to the thickness observed on the sheath element in the immediate upstream zone of the grids, not only at the level of the grids themselves but also immediately downstream of said grids.

Finally, and according to Applicant's observation, depending on the location of the grid, this effect is observed over about 10 to 30 cm downstream of the grid, the zirconia or oxide layer becoming thicker on the part of the sheath element located in the intergrid space to reach a peak a little after the middle of the inverval, the highest peak being between the grids F and G.

Figure 2:
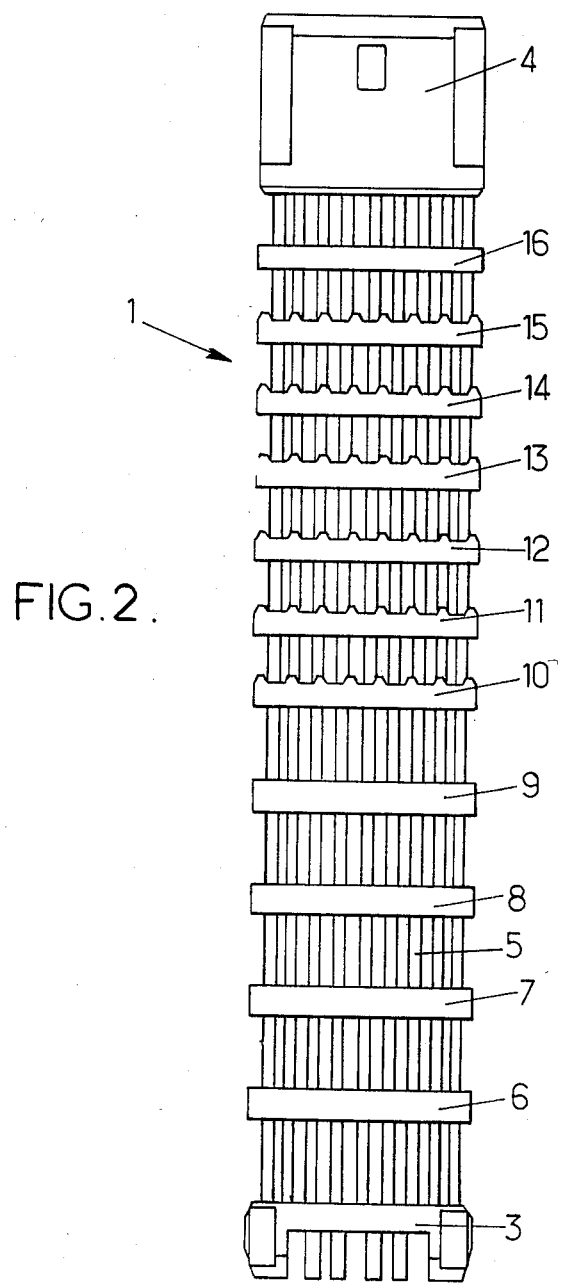
FIG. 2 is a diagrammatic view of a fuel assembly for a Pressurized Water Reactor comprising grids spaced according to the invention.

FIG. 2 shows diagrammatically an assembly 1 comprising a skeleton including a lower end part 3 and an upper end part 4, connected by elongated elements such as guide tubes 5.

The assembly is provided with lower grids 6, 7, 8, 9 and upper grids 10, 11, 12, 13, 14, 15, 16, the distance between two adjacent upper grids situated in the upper half of the assembly 1 being smaller than the distance existing between two adjacent lower grids situated in the lower half of the assembly 1. In the particular case shown, the assembly comprises seven upper grids and four lower grids, these numbers not being limiting.

To locate as shown the seven upper grids, allows a better mixing of the coolant in the upper part of the assembly than the mixing obtained with an assembly of the prior art and this for a same thermal power dissipated by the reactor and a same output temperature of the coolant, from the assembly; this results in a lower temperature of the sheath and hence permits the growth of the oxide layer thickness in this part to be slowed down. The formation of corrosion on the fuel elements on the part comprised between the grids E and H of FIG. 1 is therefore delayed.

In one advantageous embodiment of the invention, the number of grids in the upper part is doubled, the fuel elements being for example tie braced by grids positioned axially every 25 cm.

Figure 3:
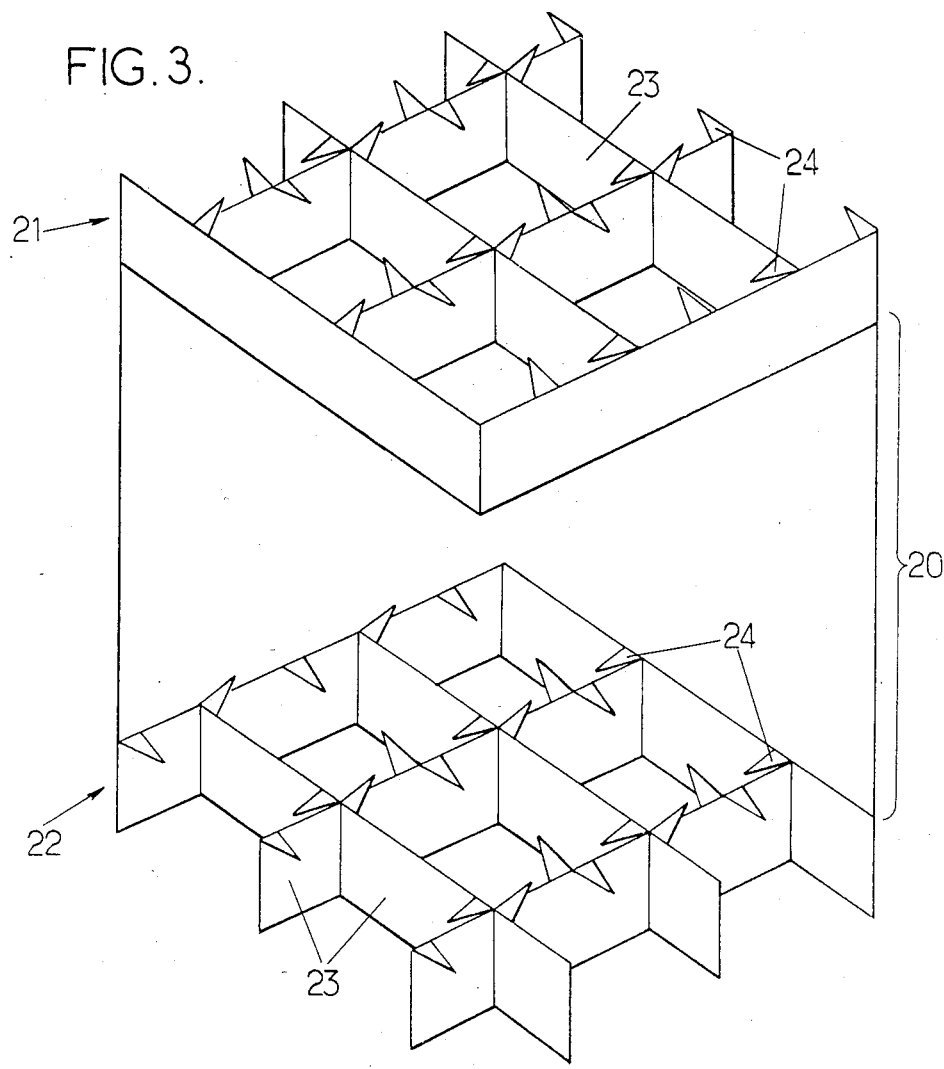
FIG. 3 is an isometric and a diagrammatic view of upper grids comprising two beds of plates and showing a possible arrangement of the fins preferably used in an assembly of the invention.

FIG. 3 shows diagrammatically a type of upper grid 10 in an assembly according to the invention. It comprises two parallel beds 21 and 22 of plates 23 for holding and spacing the fuel elements. The plates are provided with mixing fins 24, so as to ensure, in addition to their supporting function, a function of mixing the fluid streams.

Figure 4:
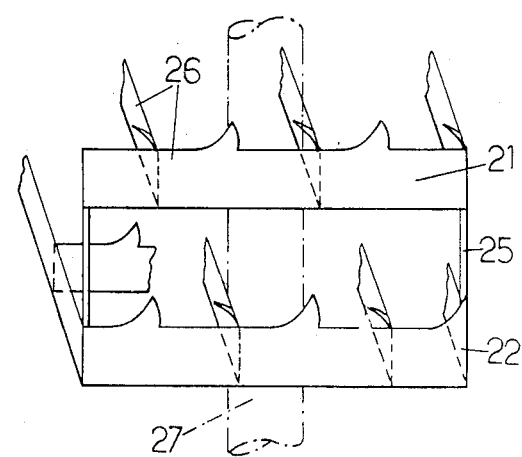
FIG. 4 is an isometric and diagrammatic view showing a possible arrangement of the fins in an upper mixing grid with two beds of plates as in FIG. 3.

FIG. 4 shows a type of mixing grid with two beds 21 and 22. The beds are joined by rods or corner bars 25. Each bed comprises plates 26 mounted in two different directions. It will be noted that each bed of plates as appearing in FIGS. 3 and 4 is incomplete in the sense that the receiving cell for fuel elements 27 is only completely defined by plates belonging to two beds.

The upper grids may be of the type described in French document FR No. 86 02 501, but other types of grids are also suitable for an assembly according to the invention.

Figure 5:
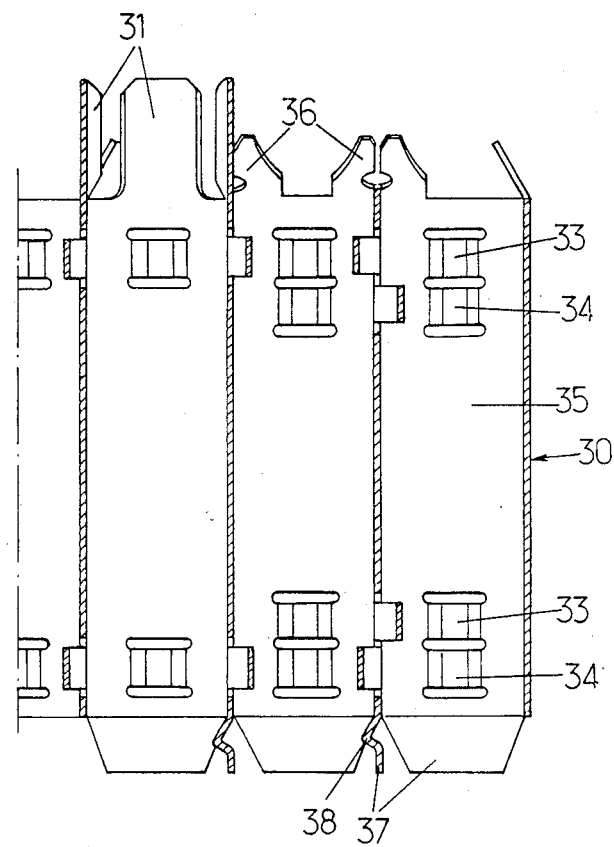
FIG. 5 is a front view showing a possible arrangement of the constituting plates of an upper grid provided in an assembly of the invention.
Figure 6:
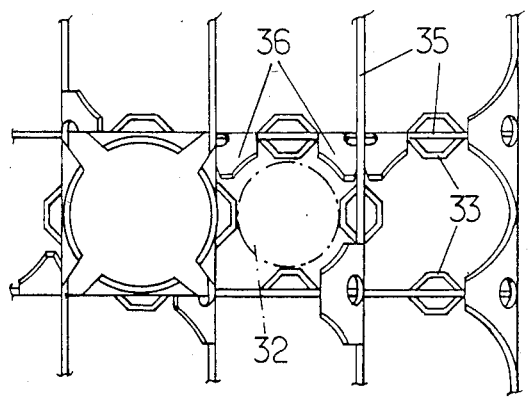
FIG. 6 is a partial view from above of FIG. 5.

FIGS. 5 and 6 shows a possible embodiment of the upper grids with a single bed and show fastening blades 31 for fixing the grid 30 to some of the guide tubes.

The grid 30 ensures a function of bracing fuel element 32 with the protruding parts or bosses 33, 34 located on each surface of the plates 35 at two levels. It introduces turbulences into the coolant flow passing upwardly through the assembly with fins 36, for example of the type described in French patent application FR No. 8416803.

To increase further the rigidity of the grid, at least some of the plates are extended advantageously by a protruding portion 37 having a longitudinal stiffening fold 38.

FIG. 7 shows, from above, lower grids advantageously used in an assembly of the invention. These grids comprise two sets of plates 40 in which are formed slots 41 (FIG. 8). Once fitted together, the plates are fixed by welding 42, for example, by electron gun. The plates 40 are stamped so as to create protruding parts causing each side of the plate to project into two adjacent recesses such as holes or cells 43 and 44 on FIG. 7. These protruding parts ensure the lateral bracing of the elements containing fissile material, such as the fuel element 45 on FIG. 7.

The grid shown in FIG. 7, 8 and 9, comprises on each surface of a cell, a single boss. The bosses corresponding to the cell 43 are referred to by number 46 on FIGS. 8 and 9. The bosses on two surfaces are at a different level from that of the bosses born by the two perpendicular surfaces. Each element containing fissile material 45 is hence braced laterally due to permanent contact with four bosses. With each boss 46 is associated a boss 47 oriented in opposite direction, except in the case of the walls which define a cell occupied by a guide tube 48 (FIG. 7). The lower grids do not include fins. They hence only participate slightly in the mixing of the fluid streams and, consequently, only introduce a very small head-loss.

The invention is in no way limited to the embodiments which have been described. It covers also particularly:

Those where the grids have a polygonal non-rectangular cross-section,

Those where the lower grids are also provided with mixing fins,

Those where the upper grids and/or lower grids differ from one another.

We claim:

1. In a nuclear reactor having a vessel for containment of a moderating and cooling pressurized water, a core in said vessel, arranged to be upwardly traversed by said water and comprising a plurality of mutually adjacent upstanding nuclear fuel assemblies, a nuclear fuel assembly comprising:
   a bundle of fuel elements comprising a plurality of fuel elements, each having a zirconium base tubular sheath having an upper end portion and a lower end portion and containing nuclear fuel material,
   a rigid structure for maintaining and supporting said bundle of fuel elements in parallel relationship, said rigid structure having an upper end piece and a lower end piece connected together by tie rods and a plurality of grids, spaced apart along the tie rods, said plurality of grids comprising :
an upper set of grids consisting of upper grids located in an upper part of the assembly, regularly spaced apart from each other at a first predetermined distance and having first flow mixing means for mixing water streams traversing said upper grids,
a lower set of grids consisting of lower grids located in a lower part of the assembly, regularly spaced apart from each other at a second predetermined distance larger than the first predetermined distance and having second flow mixing means constructed and arranged for a less efficient mixing of the water stream than the first flow mixing means of the upper grids,
whereby the upper grids construction and arrangement limit corrosion of the zirconium base tubular sheaths in their upper end portion and reduce the temperature gradient between the upper end portion and the lower end portion of said sheaths due to the increased heat exchange provided by said upper grids between the upper end portion of the sheaths of the fuel elements and the water.

2. A nuclear fuel assembly according to claim 1, wherein the upper grids of the upper set of grids are provided with flow mixing fins, the lower grids of the lower set of grids are devoid of fins, and said nuclear fuel assembly further comprises a top grid located between the upper set of grids and the upper end piece of the nuclear fuel assembly and devoid of fins.

3. A nuclear fuel assembly according to claim 1, wherein the first predetermined distance between the upper grids has a value within the range of 15 to 30 cm.

4. A nuclear fuel assembly according to claim 1, wherein the upper grids comprise a peripheral belt and at least two series of parallel plates, the plates of one serie being of an angle with the plates of the other so that the series define passage cells for the fuel elements, said parallel plates being distributed in at least two beds spaced in the longitudinal direction of the assembly, and being provided with fins having different orientations.

* * * * *